(12) United States Patent
Zeilbeck et al.

(10) Patent No.: US 7,669,288 B2
(45) Date of Patent: Mar. 2, 2010

(54) HINGE ARRANGEMENT FOR A COVER ELEMENT

(75) Inventors: Franz Zeilbeck, Landshut (DE); Georg Sigl, Arnstorf (DE); Josef Stöckl, Pfeffenhausen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 420 days.

(21) Appl. No.: 11/656,823

(22) Filed: Jan. 23, 2007

(65) Prior Publication Data

US 2007/0180657 A1 Aug. 9, 2007

(30) Foreign Application Priority Data

Jan. 24, 2006 (DE) ........................ 10 2006 003 351

(51) Int. Cl.
*E05D 7/00* (2006.01)

(52) U.S. Cl. ........................................ 16/354; 296/37.8

(58) Field of Classification Search ................. 16/35 R, 16/113.1, 354, 231, 281; 296/37.8, 37.12, 296/37.9, 37.13, 146.11, 24.43; 49/32
See application file for complete search history.

(56) References Cited

U.S. PATENT DOCUMENTS

| | | | | | |
|---|---|---|---|---|---|
| 2,205,396 A | * | 6/1940 | Colucci | ........................ | 16/318 |
| 3,061,049 A | * | 10/1962 | Bramley | ........................ | 188/21 |
| 3,083,402 A | * | 4/1963 | Foltz | ........................... | 16/318 |
| 3,546,736 A | * | 12/1970 | Booth | ........................ | 16/312 |
| 3,648,327 A | * | 3/1972 | Edeus | ........................ | 16/236 |
| 4,580,315 A | * | 4/1986 | Beckwith | ..................... | 16/308 |
| 4,991,259 A | * | 2/1991 | Finkelstein et al. | ........... | 16/312 |
| 5,121,521 A | * | 6/1992 | Hagiwara et al. | ............. | 16/278 |
| 5,163,735 A | * | 11/1992 | Aljundi | ................. | 297/378.11 |
| 5,452,941 A | * | 9/1995 | Halse et al. | ................. | 297/480 |
| 6,191,937 B1 | * | 2/2001 | Bang | ..................... | 361/679.23 |
| 6,832,412 B2 | * | 12/2004 | Kim | ........................... | 16/354 |
| 6,961,976 B2 | * | 11/2005 | Kuo | ........................ | 280/79.11 |
| 7,044,529 B2 | * | 5/2006 | Svenson et al. | ............. | 296/37.8 |
| 7,407,200 B2 | * | 8/2008 | Ichimaru | .................... | 292/194 |
| 7,469,953 B2 | * | 12/2008 | Heath et al. | ................... | 296/76 |
| 7,487,884 B2 | * | 2/2009 | Kim | ........................... | 220/827 |
| 2002/0089225 A1 | * | 7/2002 | Bruck et al. | ........... | 297/378.11 |
| 2003/0080131 A1 | * | 5/2003 | Fukuo | ........................ | 220/264 |

FOREIGN PATENT DOCUMENTS

DE 19506295 A1 9/1996

\* cited by examiner

*Primary Examiner*—Victor Batson
*Assistant Examiner*—Michael Lee
(74) *Attorney, Agent, or Firm*—Wolf, Greenfield & Sacks, P.C.

(57) ABSTRACT

A hinge arrangement for a cover element in the passenger compartment of a motor vehicle, for example a hinged cover for a glove compartment or a CD player compartment is disclosed. The cover can be pivoted from a closed position into an open position about a pivot axis. The hinge arrangement includes an arrangement whereby the cover may be displaced (for example, substantially transversely to the pivot path) during the pivoting movement.

7 Claims, 8 Drawing Sheets

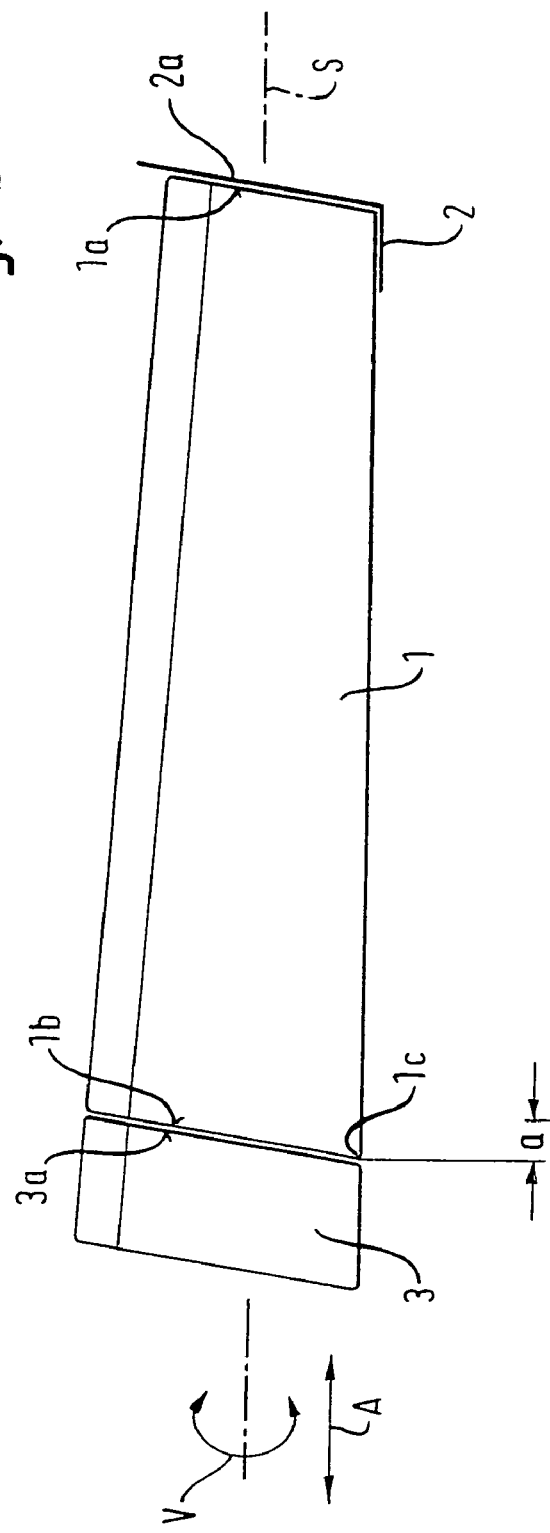
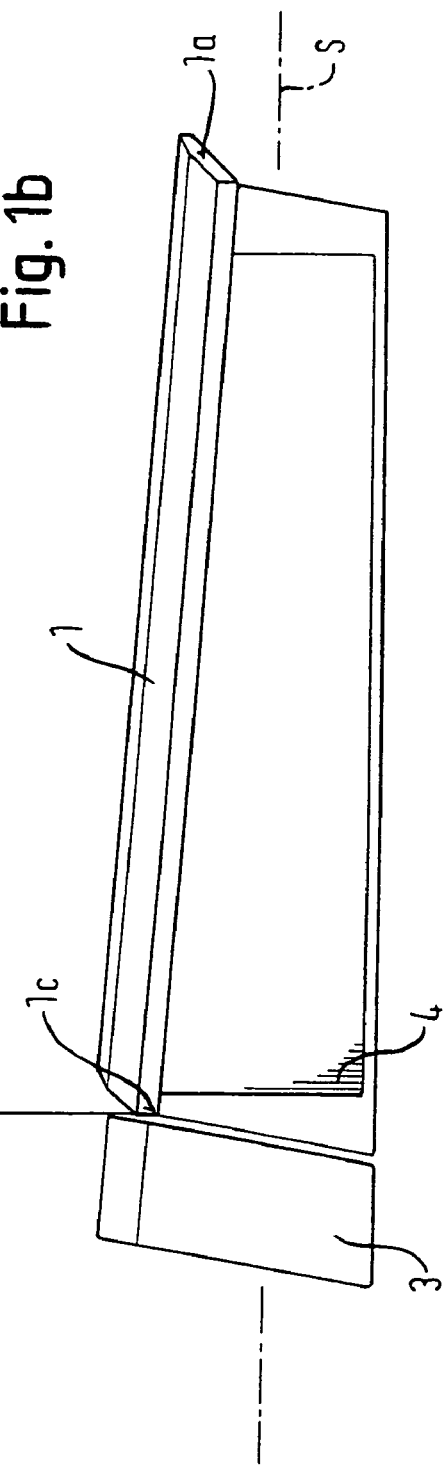

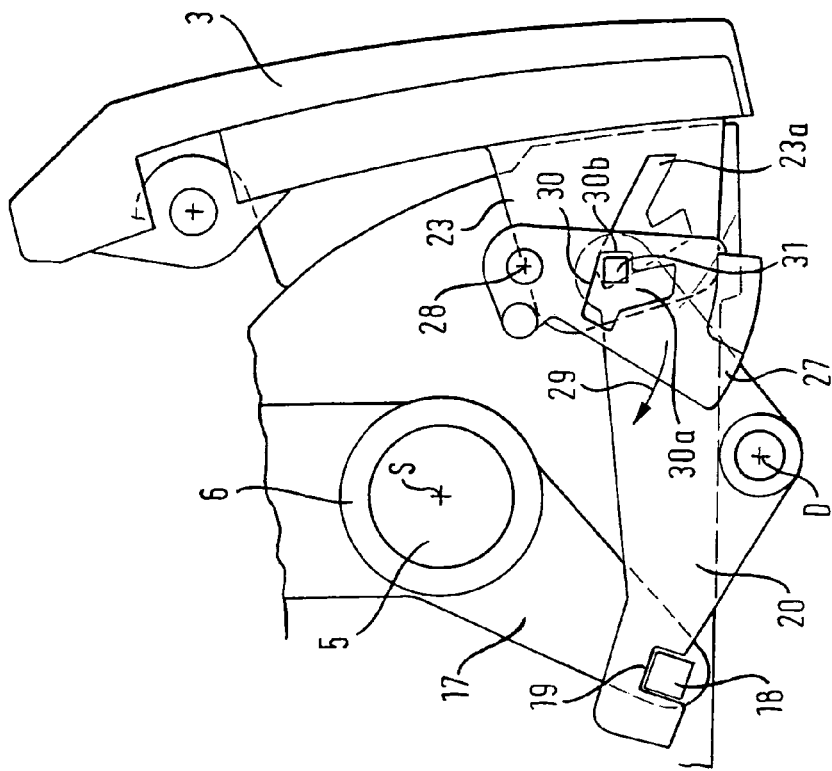
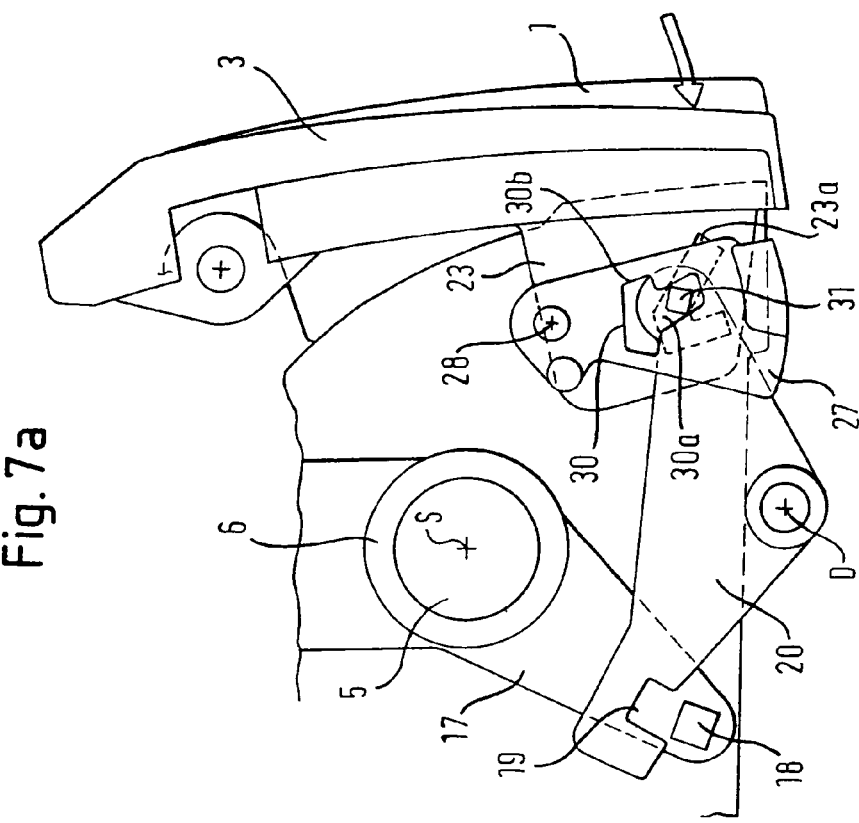

HINGE ARRANGEMENT FOR A COVER ELEMENT

CROSS REFERENCE TO RELATED APPLICATION

Foreign priority benefits are claimed under 35 U.S.C. §119 (a)-(d) or 35 U.S.C. §365(b) of German Application No. DE 10 2006 003 351.5, filed Jan. 24, 2006, which is hereby incorporated by reference in its entirety.

BACKGROUND

1. Field

Aspects of the invention relate to motor vehicle technology and in particular to openable hinged closures for a compartment such as, for example, the glove compartment, the compartment for a CD player or other compartments of the motor vehicle.

2. Discussion of Related Art

Hinged covers for motor vehicle compartments are known. The surface area and/or contours of the hinged covers is/are usually aesthetically matched to the surrounding components, typically resulting in a relatively simple design. However, a significant departure from such a conventionally looking design is difficult in large part because the pivot axis must be located such that the cover can pivot open and close without interfering adjacent components.

SUMMARY

According to one embodiment, a hinge arrangement for a cover element in the passenger compartment of a motor vehicle is provided. The cover element can be pivoted from a closed position into an open position about a pivot axis (S). The hinge arrangement includes a displacement mechanism. The cover element is displaced substantially transversely to the pivot axis during the pivoting movement.

In another illustrative embodiment, a motor vehicle interior storage compartment for a motor vehicle is provided. The compartment includes a storage container having an access opening and a cover operably associated with the storage container and arranged to cover the opening. The cover has an open position whereby the access opening is exposed and a closed position whereby the access opening is covered. A hinge arrangement is coupled to the cover and operable to move the cover between the open and closed positions through at least two degrees of freedom.

In yet another illustrative embodiment, a motor vehicle interior storage compartment for a motor vehicle is provided. The compartment includes a storage container having an access opening and a cover operably associated with the storage container and arranged to cover the opening. The cover has an open position whereby the access opening is exposed and a closed position whereby the access opening is covered. A hinge arrangement is coupled to the cover and operable to lock the cover in the closed position if deceleration of the motor vehicle exceeds a threshold value.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 1a is a schematic representation of a front view of an exemplary cover shown in the installed state when in the closed condition;

FIG. 1b is a schematic representation of the cover of FIG. 1a shown in the open condition;

FIG. 5b is a partial view of the latching device of FIG. 5a;

FIG. 7a is an end view with the latching device in the open condition and showing an operating button; and FIG. 7b is an end view of the latching device of FIG. 7a shown in the locked condition.

DETAILED DESCRIPTION

Figure 2:
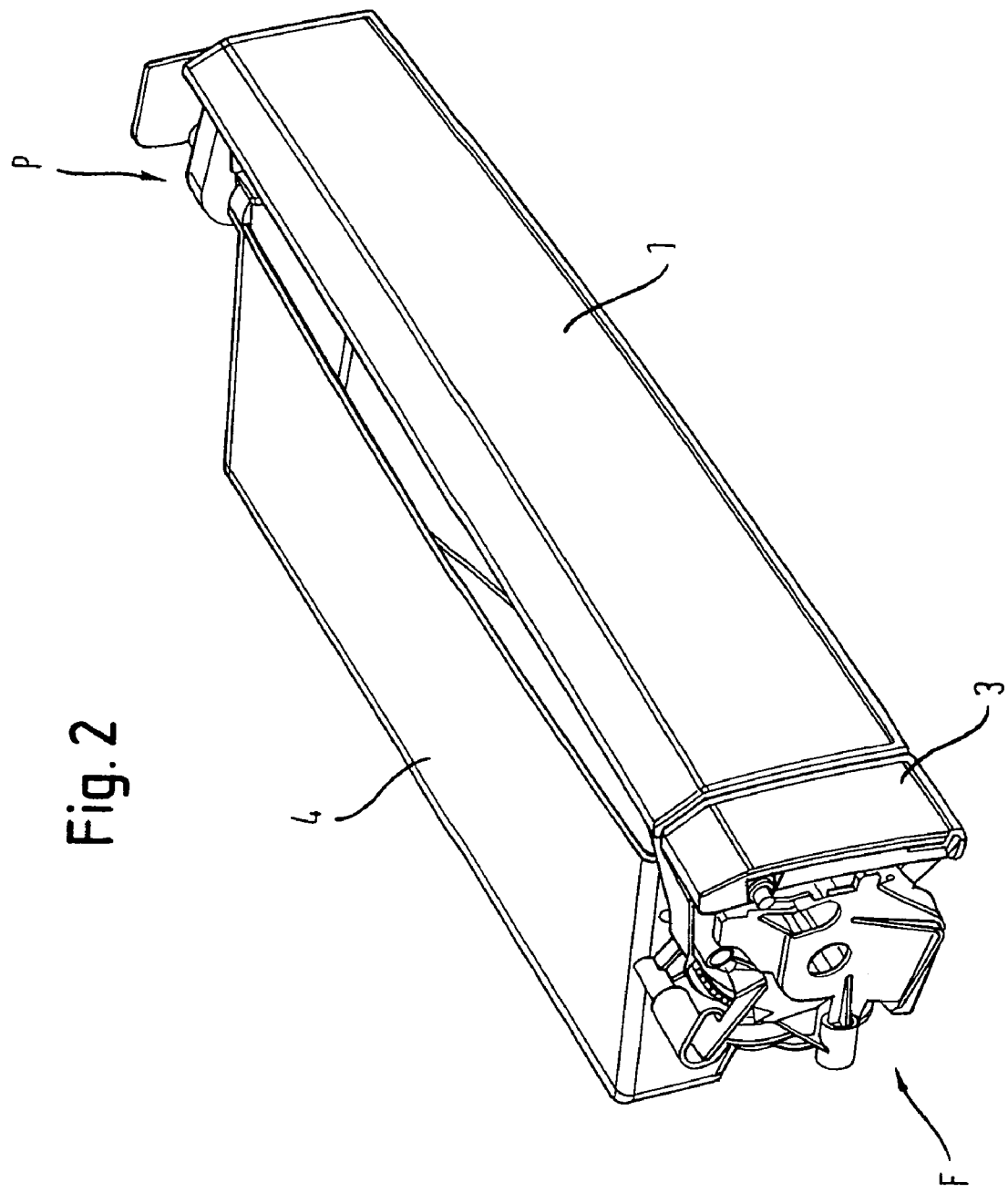
FIG. 2 is a perspective view of an exemplary compartment with a closed cover and showing an end view of an exemplary hinge arrangement.

Aspects of the invention are directed to hinge arrangements for a cover element in the passenger compartment of a motor vehicle, for example, a hinged cover for a glove compartment or a CD player compartment or other compartments, which permits greater flexibility with regard to the interior design. In this regard, hinged covers that would otherwise interfere with surrounding components when in or moving between open and closed conditions may now, according to aspects of the invention, move without such interference. This allows an interior car designer to employ complex shapes, contours and/or movements of the covers.

According to one embodiment, a hinge arrangement in which the cover element can be pivoted from a closed position into an open position about a pivot axis and which may be displaced along and/or about the same or another axis to produce a combination movement is provided. In one embodiment, the cover moves substantially transversely to the pivot path during the pivoting movement. In one embodiment, the hinge arrangement includes a displacement mechanism allowing such translational motion. In this regard, the cover, according to an aspect of the invention, can move in two degrees of freedom.

Due to such movement, there is, therefore, the opportunity to implement a design layout which matches the surrounding areas and/or contours where a purely pivotal movement would not be possible as the cover element would otherwise collide with adjacent components of the passenger compartment fittings. The additional displacement direction, such as provided by, in one embodiment, a displacement mechanism, enables opening and closing of the cover element without such interference. As may be appreciated, such a combination movement will allow the motor vehicle art greater design freedom with functional reliability.

It should be appreciated that the present invention is not limited to providing such a combination movement only when the cover would otherwise interfere with surrounding components. In this regard, an automotive interior designer may wish to employ such a combination movement even when the cover would otherwise be entirely functional with only a pivoting motion, for example.

In one embodiment, the cover may be pivotable about a pivot axis and automatically axially displaceable on this pivot axis. This enables a combination movement which is simple and functionally reliable for opening and closing the cover element.

For the automatic displacement movement of the cover element, in one embodiment, the cover may be provided with a cam element which cooperates with a stationary cam follower element. The cover may, however, also be provided with the cam follower element which cooperates with a stationary cam element. In one embodiment, the cam element is designed such that an increase in the guide height corresponding to a cam track is provided in the axial direction, bringing about the axial displacement when the pivoting movement is performed.

In one embodiment, regardless of where it is attached, the cam element may have a slideway as the cam track on which the cam follower element slides. In one embodiment, the cam element has a toothed track, and in one embodiment, a segment-shaped toothed track, as the cam track, for example, as a toothed ring. The toothed ring need not be closed but must merely be adapted to the opening and pivoting movement. This toothed track is then engaged with a toothed wheel as the cam follower element.

In one embodiment, the cover has a stationary guide element in the axial direction on the side facing away from the engagement area between the cam element and the cam follower element. The guide element permits only an axial displacement that is controlled by the cam element and the cam follower element. To accomplish this, the stationary guide element cooperates with a reciprocal guide element running in line with the height increase of the cam element's guide. This prevents the cam element and the cam follower element from becoming accidentally disengaged.

In one embodiment, the cover element may be latchable and unlatchable by way of a handle. In one embodiment the opening movement is damped by means of a moving spring after unlatching.

A latching lever, which in the cover element's closed state latches into a reciprocal latching lever, may be rigidly connected to the cover for latching and unlatching thereof. Unlatching and thus opening of the cover element is also possible directly or indirectly by way of this latching lever. The reciprocal latching lever may be lockable by employing an inertia pendulum. This arrangement may prevent or reduce the likelihood of the cover element opening in the event of a vehicle accident or other rapid deceleration.

Turning to the figures, in FIG. 1a, a cover element 1 is schematically shown in the closed condition and, in FIG. 1b, in the fully open condition. A pivot axis S is also represented about which cover element 1 is pivotable for opening and closing. On the right side of FIG. 1a, adjacent structural part 2 is diagrammatically shown. In this illustrative example, angled edge 2a runs parallel to adjacent edge 1a of cover element 1. If the automotive designer were only concerned with this edge, a purely pivoting opening movement about pivot axis S from the position shown in FIG. 1a into the position of cover element 1 shown in FIG. 1b would be possible without edge 1a of cover element 1 colliding with edge 2a of the adjacent structural element.

However, on the left hand side of FIG. 1a, an operating button 3 is located. On this side, cover element 1 also has an angled edge 1b which runs approximately parallel to edge 1a. This edge 1b runs parallel and in close proximity to an edge 3a of operating button 3. Edges 1b and 3a would collide with each other on a purely pivoting opening movement of cover element 1 about pivot axis S. Therefore, according to one aspect of the invention, cover element 1 moves in a manner such that edge 1b moves away from edge 3a automatically upon pivoting. In one embodiment, cover element 1 executes an axial movement A in the direction of pivot axis S upon pivoting movement V. This prevents edges 3a and 1b from colliding and enables the design of cover element 1 illustrated. This is rendered visible in FIGS. 1a and 1b by axial gap distance a, which is defined by the distance corner 1c of the cover element travels during the opening movement of the cover element in the axial direction. As mentioned, the present invention is not limited to providing such a combination movement only when the cover would otherwise interfere with surrounding components.

In one embodiment, the opening process of cover element 1 from the position shown in FIG. 1a into the position shown in FIG. 1b is damped and in one embodiment is initiated by pressing operating button 3. However, it should be appreciated that the present invention is not limited in this respect, as the opening motion need not be damped. In FIG. 1b it is possible to see a compartment 4 represented in schematic form behind cover element 1. Compartment 4 includes a storage container. Compartment 4, cover element 1, and a hinge assembly for opening and closing of the cover are shown more clearly in FIG. 2. The hinge includes an active functional component F and a passive component P. Alternatively, the hinge may include two active or functional components, as the present invention is not limited in this respect.

Figure 3:
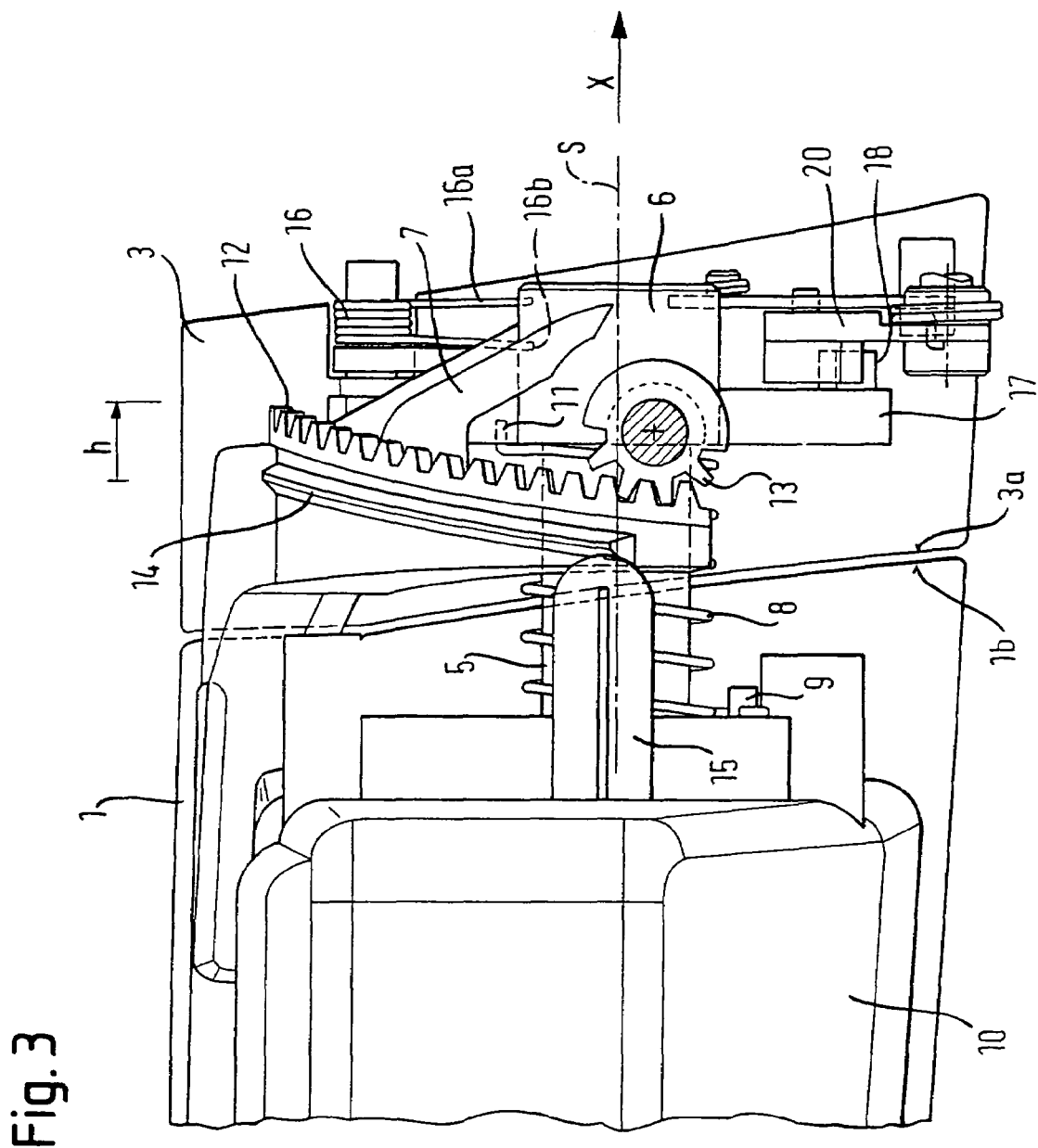
FIG. 3 is a rear view of the hinge arrangement of FIG. 2.

In FIG. 3, which is a rear view of the functional component F, a pivot axis pin 5, fixed on the compartment side of the functional component F of the hinge assembly, is shown. Cover element 1 is coupled to pin 5 and rides in sleeve 6 such that a pivoting movement V and an axial movement A can occur. Pivot axis pin 5 has a counterpart element (such as a pin, not shown) in passive component P on the opposite side of the hinge assembly.

Sleeve 6 is connected to cover element 1 by way of a connection element, such as ligament 7. A helical spring 8 is arranged on pin 5 and is pretensioned such that it pushes cover element 1 into the open position by way of ligament 7 upon pressing operating button 3. To accomplish this, in one embodiment, helical spring 8 is supported at point 9 on compartment housing 10 and the other end of helical spring 8 is supported at point 11 on ligament 7 and thus on cover element 1. Helical spring 8 is axially compressible and thus does not obstruct the axial movement of ligament 7 with sleeve 6. Other suitable arrangements for biasing the cover 1 may be employed, as the present invention is not limited in this respect.

Figure 5A:
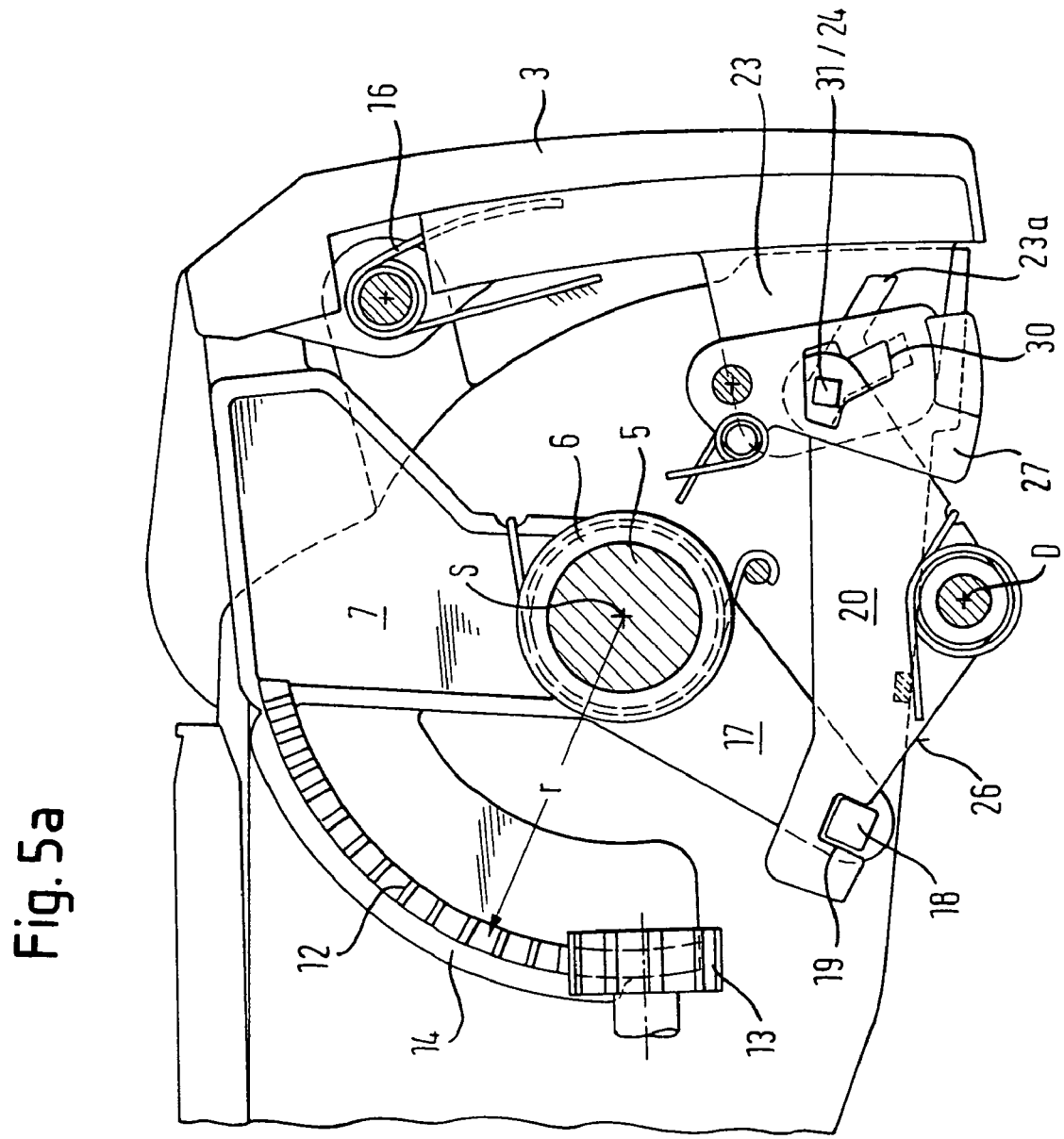
FIG. 5a is an end view of the hinge arrangement with an exemplary latching device shown in the latched condition.

Continuing with reference to FIG. 3, a segment-shaped toothed rack 12 is located on cover element 1 in the vicinity of ligament 7. The rack 12 has a radius r relative to pivot axis S (see FIG. 5a). Rack 12 also has an increasing guide height (inclination) h in the axial direction (which corresponds substantially to the aforementioned axial gap a), to bring about the axial movement to the left of cover element 1 on opening. In this regard, segment-shaped toothed rack 12 cooperates with a stationary pinion 13, whereby pinion 13, acting as a cam follower element, rolls in the toothing of segment-shaped toothed rack 12, acting as a cam track, during the opening and closing movement of the cover element. The inclination of segment-shaped toothed rack 12 may be continuous but also discontinuous depending on which axial movement has to be considered for matching the structural conditions. As will be appreciated, the length and radius r as well as the diameter of the pinion 13 may be varied, based on the operating conditions of the cover. Other suitable drive arrangements, other than a rack and pinion arrangement, may be employed, as the present invention is not limited in this respect.

A guide strip 14 is disposed on cover element 1. In one embodiment, the guide strip is disposed on the side of segment-shaped toothed rack 12 facing away from the meshing. The guide strip extends substantially along the segment-shaped toothed rack (at substantially the same inclination and thus the same course). The guide strip has a projection that cooperates with a projection 15 fixed on the compartment. This ensures that pinion 13 remains constantly meshed with the toothing of segment-shaped toothed rack 12 during the entire opening and closing movement of cover element 1. As guide strip 14 runs parallel to the toothing of segment-shaped toothed rack 12 and is thus angled, the guide strip 14 permits the previously described axial movement of cover element 1.

In one embodiment, spring 16 is operably coupled to operating button 3, as shown in FIG. 3. One end 16a of spring 16 is supported on operating button 3 and the other end 16b of spring 16 is supported on the compartment housing. Spring 16 pushes operating button 3 into the starting position shown in FIG. 2. Other suitable biasing arrangements may be employed, as the present invention is not limited in this respect.

In one embodiment, pinion 13 is supported in silicone, a result of which is that the movement of pinion 13 is damped and thus the opening and closing movement of cover element. 1 is also damped. Other suitable arrangements for damping the motion may be employed, as the present invention is not limited in this respect.

Figure 4:
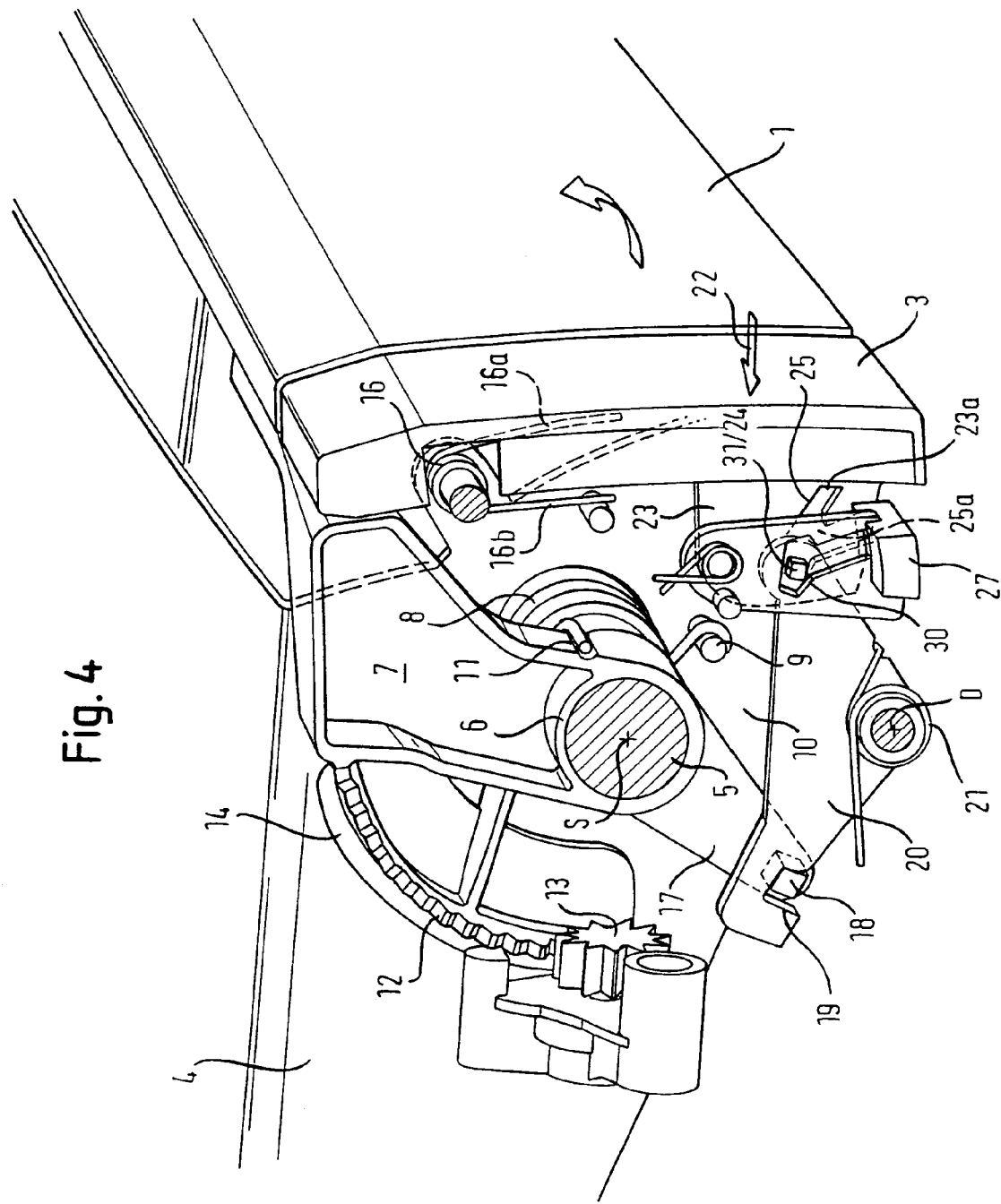
FIG. 4 is a perspective end view of the hinge arrangement of FIG. 3.

Referring now to FIG. 4 the latching mechanism is shown. A lever 17, which is provided in the axial direction with a latching cam 18, projects from sleeve 6 of cover element 1. In the closed condition, the latching cam 18 is engaged with a latching recess 19 of a double latching lever 20, which is rotatable about an axis of rotation D against the force action of a spring 21.

One illustrative embodiment of the operating components and of the operating process will now be described; however, the present invention is not limited in this respect, as other components and modes of operation may be employed.

Operating button 3 is pressed against the force of spring 16 to open cover element 1 in the direction of arrow 22. Operating button 3 has an operating shoulder 23 with an operating recess 23a into which an operating cam 24 engages (not visible in FIG. 4 but is behind locking cam 31 and is disposed opposite on the other side of double latching lever 20). Operating recess 23a is located on operating shoulder 23. Operating cam 24 and locking cam 31 are disposed on opposite sides of on double interlocking lever 20.

Figure 5B:
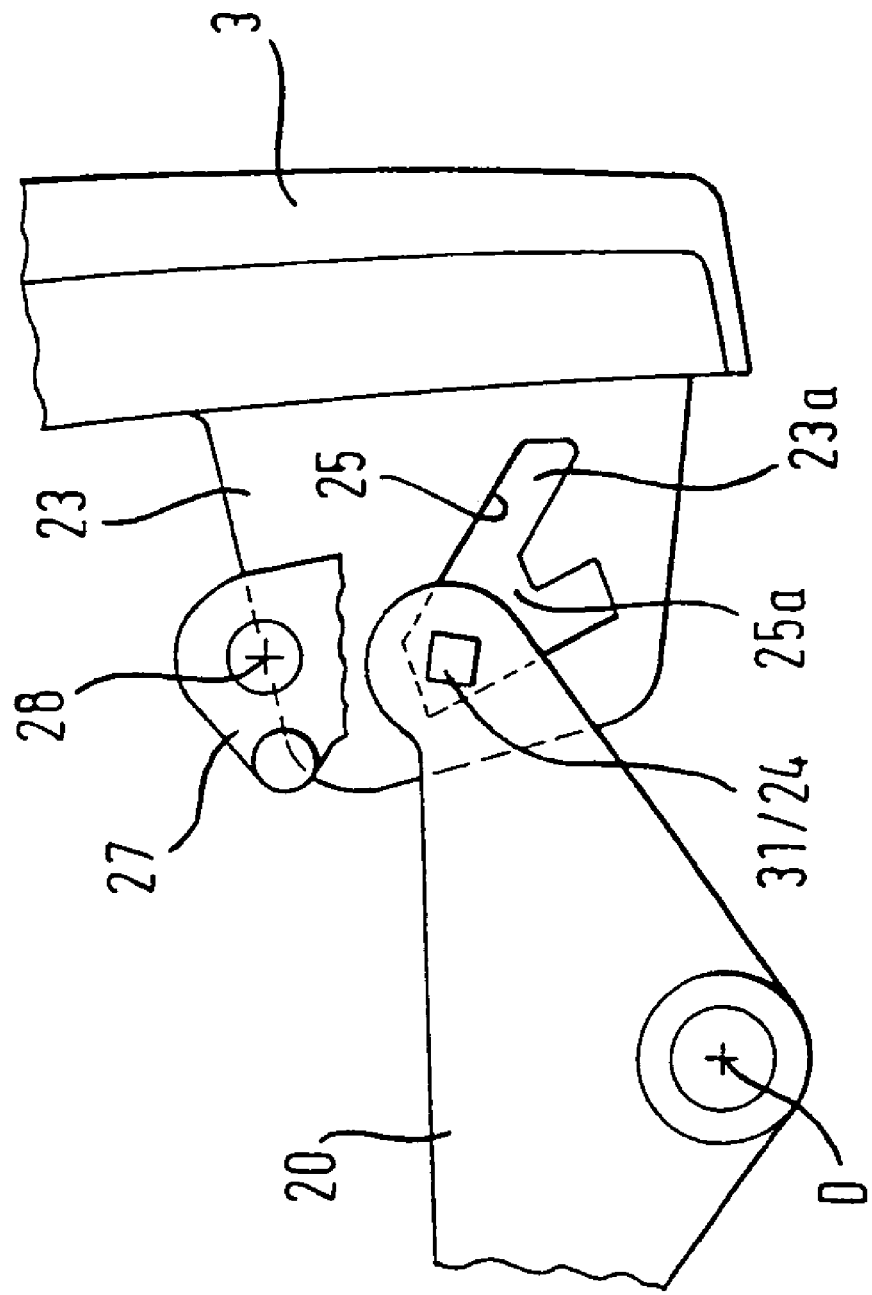
Figure 6:
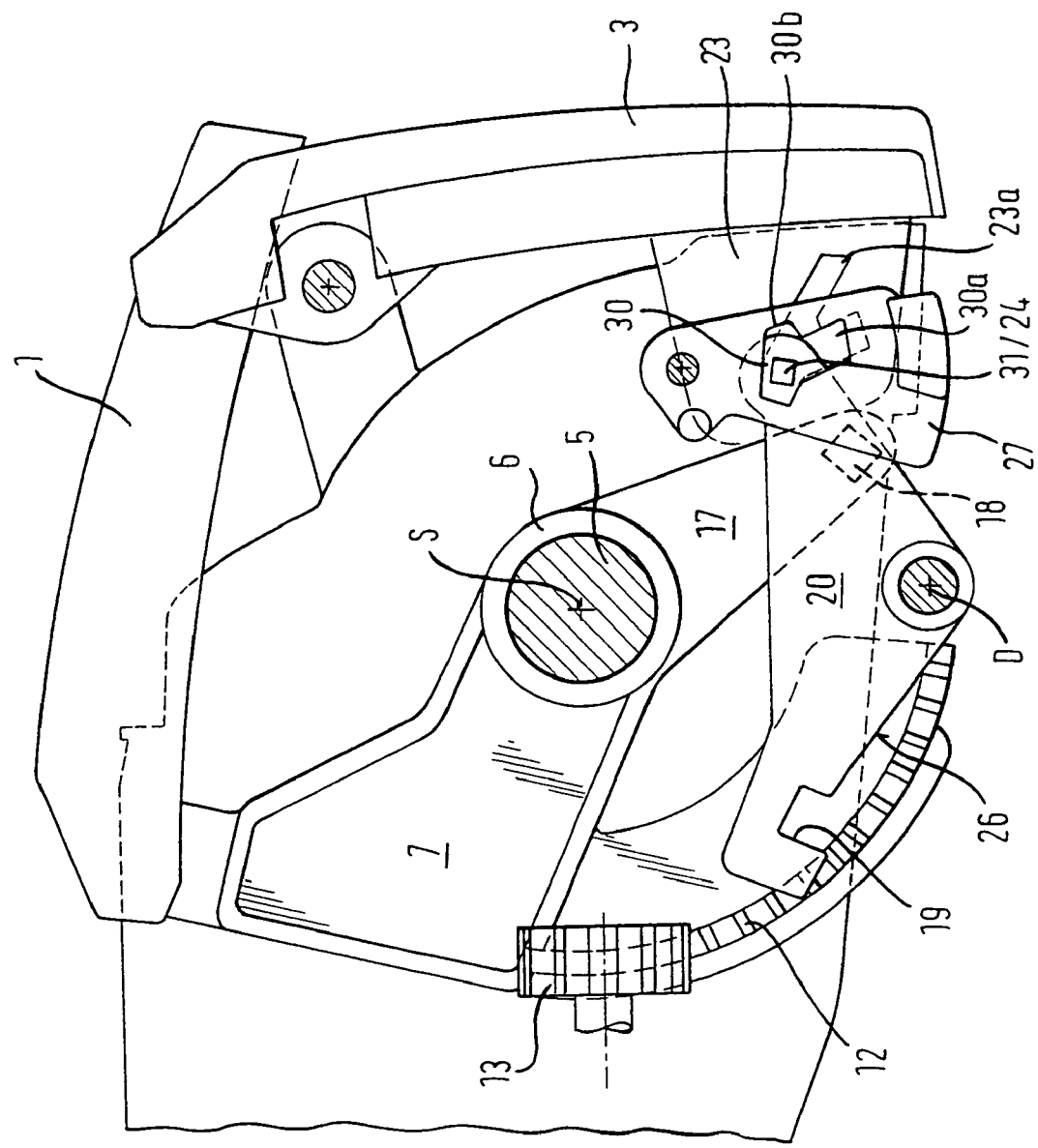
FIG. 6 is an illustrative diagram of the latching device of FIG. 5a, showing the latching device in the unlatched position and with the cover open.

When operating button 3 is pressed in the direction of arrow 22, an operating cam surface 25 of operating recess 23a moves over operating shoulder 23 against operating cam 24 of double lever 20 so that said lever is pivoted clockwise in FIG. 4. As a result latching recess 19 releases latching cam 18 and lever 17 of cover element 1 is released. Due to spring 8, cover element 1 is pivoted from the position shown in FIG. 5 into the position shown in FIG. 6, whereby the above-mentioned axial movement A occurs. As mentioned, pivoting movement of cover element 1 may be damped.

When cover element 1 is closed again, latching cam 18 slides along an inclined surface 26 of double latching lever 20 into latching recess 19 of double latching lever 20 so that the closed position of the cover element is again. In this regard, double latching lever 20 is pivoted slightly clockwise to ensure latching. At the same time, operating cam 24 moves away from operating cam surface 25, and has space for this in a section 25a of operating recess 23a. When pin 18 latches into recess 19, double lever 20 pivots counter-clockwise back into the starting position so that operating cam 24 is located back in the correct starting position inside operating recess 23a.

According to another aspect, in one illustrative embodiment, the functional component also comprises a safety feature which prevents or at least reduces the likelihood of cover element 1 from opening in the event of an accident or other rapid vehicle deceleration if operating button 3 is unintentionally actuated. This situation is depicted in FIGS. 7a and 7b. FIG. 7a shows the normal function in which an inertia pendulum 27, which swings about an axis 28, is located in a position in which release by the operating button can take place. In this regard, when pressing operating button 3, double latching lever 20 can be pivoted clockwise so that unlatching is possible. Pendulum axis 28 is stationary and provided on the compartment.

In the position shown in FIG. 7b, which represents a rapid deceleration of the vehicle, inertia pendulum 27 is pivoted about arrow 29. In this regard, when the vehicle's deceleration exceeds a threshold value, the inertia pendulum is constructed to rotate to lock the cover. A locking recess 30 is located in inertia pendulum 27. Locking cam 31 of operating shoulder 23 projects into recess 30. This locking recess 30 is provided with a recess section 30a such that it does not impede the normal latching and unlatching process. In this regard, during the actual unlatching process, double latching lever 20 is pivoted clockwise and takes with it locking cam 31. Locking cam projects into locking recess 30 and locking cam 31 has space to move inside locking recess 30. However, if inertia pendulum 27 is in the position shown in FIG. 7b, then on attempting to move operating button 3 in the direction of the arrow shown in FIG. 7a, locking cam 31 prevents a rotating movement of operating cam 24 with the result that unintentional opening of the cover element is not possible. Operating cam 24 then actually sits in a locking section 30b of locking recess 30. After the vehicle comes to rest or resumes normal deceleration, the inertia pendulum moves counter-clockwise back into the starting position to allow for release.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A motor vehicle interior storage compartment for a vehicle, the compartment comprising:
    a storage container having an access opening;
    a cover operably associated with the storage container and arranged to cover the opening, the cover being pivotable about a horizontal axis (S) having an open position whereby the access opening is exposed and a closed position wherein the access opening is covered; and
    a hinge arrangement pivotally connecting said cover to said storage container and comprising:

a displacement mechanism whereby the cover undergoes translation along the pivot axis during the pivoting movement, the displacement mechanism comprising a cam element provide on the cover and cooperating with a stationary cam follower element, the cam element having a cam track, said cam track having a guide height (h) inclination equal to the axial translation of the cover in the axial direction, the storage container having a guide element with one end fixed at a constant distance from the cam follower element and the opposite on the cam element, configured such that the cam element maintains contact with the cam follower element, the guide element only permitting an axial displacement of the cover corresponding to control by the cam element and the cam follower element.

2. The compartment according to claim 1, wherein the pivotable movement of the cover automatically causes the axially displaceable movement of the caver on the pivot axis.

3. The compartment according to claim 1, wherein the cam element has a toothed track as the cam track with which is engaged a gear as the cam follower element.

4. The compartment according to claim 1, wherein the cover has a guide strip cooperating with the guide element of the storage container and running parallel to the cam track.

5. The compartment according to claim 1, wherein the cover is latchable and unlatchable by a manipulating member attached to the container, an opening movement of the cover being caused by a spring after unlatching.

6. The compartment according to claim 5, wherein a latching lever is rigidly connected to the cover, wherein, in the closed state of the cover, the lever is latched into a counter latching lever attached to the container.

7. The compartment according to claim 3, wherein the gear is supported by silicone so that an opening movement of the cover is damped.

* * * * *